(12) United States Patent
Larsson et al.

(10) Patent No.: US 12,337,818 B2
(45) Date of Patent: Jun. 24, 2025

(54) METHOD FOR OPERATING A HYBRID ELECTRIC VEHICLE AND DATA PROCESSING DEVICE

(71) Applicant: Volvo Car Corporation, Gothenburg (SE)

(72) Inventors: Viktor Larsson, Gothenburg (SE); Prashant Lokur, Gothenburg (SE); Chih Feng Lee, Gothenburg (SE); Mitra Pourabdollah, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 172 days.

(21) Appl. No.: 18/049,437

(22) Filed: Oct. 25, 2022

(65) Prior Publication Data
US 2023/0150475 A1 May 18, 2023

(30) Foreign Application Priority Data
Nov. 15, 2021 (EP) ..................... 21208306

(51) Int. Cl.
*B60W 20/12* (2016.01)
*B60W 10/08* (2006.01)
(Continued)

(52) U.S. Cl.
CPC ............. *B60W 20/12* (2016.01); *B60W 10/08* (2013.01); *B60W 10/26* (2013.01); *B60W 20/13* (2016.01); *B60W 2510/244* (2013.01)

(58) Field of Classification Search
CPC ...... B60W 20/12; B60W 10/08; B60W 10/26; B60W 20/13; B60W 2510/244;
(Continued)

(56) References Cited

U.S. PATENT DOCUMENTS

2011/0071712 A1 3/2011 Mizuno et al.
2017/0050631 A1 2/2017 Muralidhar et al.
(Continued)

OTHER PUBLICATIONS

Extended EP Search Report for EP Application No. 21208306.7 dated May 10, 2022.
(Continued)

*Primary Examiner* — Abby Y Lin
*Assistant Examiner* — Renee LaRose
(74) *Attorney, Agent, or Firm* — Amin, Turocy & Watson, LLP (57) ABSTRACT

The disclosure relates to a method for operating a hybrid electric vehicle. According to the method, a route information is received in the form of a plurality of parameter sets, each parameter set relating to a segment of a route (S1). Subsequently, a power demand is estimated for each segment (S3) and a portion of an amount of energy being stored in the electric storage device is allocated to at least one of the segments. Alternatively or additionally, an amount of energy to be transferred into the electric storage device is allocated to at least one of the segments (S4). Additionally, at least one reference trajectory describing a state-of-energy of the electric storage device over the route resulting from the energy allocation is derived (S5). The operation of the hybrid electric vehicle is controlled as a function of a slope between a current state-of-energy and an upcoming control point on the reference trajectory (S7). Moreover, a data processing device comprising means for carrying out the method is presented.

20 Claims, 3 Drawing Sheets

(51) Int. Cl.
  *B60W 10/26*   (2006.01)
  *B60W 20/13*   (2016.01)
(58) Field of Classification Search
  CPC ...... B60W 2510/0666; B60W 2552/15; B60Y 2200/92; Y02T 10/62
  See application file for complete search history.

(56) References Cited

U.S. PATENT DOCUMENTS

| | | | |
|---|---|---|---|
| 2018/0058868 A1* | 3/2018 | Kang | B60W 20/12 |
| 2019/0001959 A1 | 1/2019 | Schlumpp et al. | |
| 2019/0135265 A1* | 5/2019 | Shin | G01C 21/30 |
| 2022/0203960 A1* | 6/2022 | Akiyama | B60W 20/17 |

OTHER PUBLICATIONS

Communication pusruant to Article 94(3) EPC for EP Application No. 21208306.7 dated Jun. 17, 2024.

* cited by examiner

METHOD FOR OPERATING A HYBRID ELECTRIC VEHICLE AND DATA PROCESSING DEVICE

The present disclosure relates to method for operating a hybrid electric vehicle having an electric traction machine being electrically coupled to an electric storage device, and an internal combustion engine.

Moreover, the present disclosure is directed to a data processing device comprising means for carrying out the above method.

In the present context, a hybrid electric vehicle (HEV) may be a plug-in hybrid electric vehicle (PHEV) or a non-plug-in hybrid electric vehicle.

It is known that the efficiency of a hybrid electric vehicle depends on its energy management, i.e. on the manner how the combustion engine and the electric traction machine are used. The electric traction machine generally operates at a higher efficiency as compared to the combustion engine. However due to the limited capacity of the electric storage device, it is not possible to uniquely use the electric traction machine. A further challenge is that control units for vehicles have a limited computational performance and a limited memory.

Thus, for operating a hybrid electric vehicle, always a tradeoff between high accuracy of the control method and suitability for limited computational performance has to be found.

This problem is at least partially solved or alleviated by the subject matter of the independent claims of the present disclosure, wherein further examples are incorporated in the dependent claims.

According to a first aspect, there is provided a method for operating a hybrid electric vehicle having an electric traction machine being electrically coupled to an electric storage device, and an internal combustion engine, the method comprising:
  receiving a route information in the form of a plurality of parameter sets, each parameter set relating to a segment of a route and comprising a parameter describing an average speed and a parameter describing an average road slope or an altitude difference over the segment,
  estimating a power demand for each segment,
  allocating a portion of an amount of energy being stored in the electric storage device to at least one of the segments in at least one manner and/or allocating an amount of energy to be transferred into the electric storage device to at least one of the segments in at least one manner,
  deriving at least one reference trajectory describing a state-of-energy of the electric storage device over the route resulting from allocating a portion of an amount of energy being stored in the electric storage device and/or allocating an amount of energy to be transferred into the electric storage device,
  defining a plurality of control points on the at least one reference trajectory, and
  controlling the operation of the hybrid electric vehicle as a function of a slope between a current state-of-energy and an upcoming control point on the at least one reference trajectory.

In this context, the slope is defined as the difference between a current state-of-energy and a state-of-energy of the electric storage device at the upcoming control point, divided by the route distance between a current position and the upcoming control point. It is further understood that in the present context the operation of the hybrid electric vehicle is controlled using a closed loop control. Moreover, the control is performed in real-time, i.e. a control response is guaranteed within specified time limit. Furthermore, the present method can also be used in connection with hybrid electric vehicles having more than one electric traction machine, e.g. two electric traction machines.

In order to be able to calculate the trajectories, it is clear that a starting level of the state-of-energy of the electric storage device is received.

Having the route information in the form of parameter sets relating to segments of the route is computationally efficient. Each of the segments is indexed on the route, e.g. by specifying a starting point of the segment along the route or by storing an identification of neighboring segments. It is also possible to adapt the route information to different levels of computational performance in that the length of the segments is adjusted accordingly.

Based thereon, the calculation of control points is highly efficient in terms of computational power and memory use.

Since the method uses an upcoming control point for calculating the slope and for performing the control of the hybrid electric vehicle, the method uses predictive information about the route and the state-of-energy of the electric storage device. This leads to the fact that the method can provide a high efficiency of the hybrid electric vehicle, i.e. the method is highly performant. At the same time, the method is computationally efficient, i.e. only requires limited computational performance and memory.

An output of the method may be a request or threshold for a controller of the electric traction machine signaling to the electric traction machine to start operating as an electric motor, start operating as an electric generator or stop operation. An additional or alternative output of the method may be a request or threshold for a controller of the combustion engine to start operation or to stop operation. Put otherwise, the method controls the load shifting between the electric traction machine and the combustion engine.

In an example, a number of parameter sets is reduced in that at least some of the plurality of parameter sets are combined into a respective aggregated parameter set. In other words, the number of segments received is reduced. In doing so, the method can be performed with very low computational power and memory capacity. For instance, the reduction of parameter sets may include the calculation of average aggregated parameters over a number of segments, e.g. two. The reduction of the number of parameter sets and corresponding segments may be designated a data pre-processing.

The power demand may be estimated using a vehicle model. The vehicle model may comprise a value characterizing a vehicle mass and a set of parameters defining road load in function of a road slope, an average speed and a corresponding distance. In other words, using the vehicle model, one can calculate the amount of power being necessary for traveling along one segment. This is computationally efficient. At the same time, if the size of the segments is chosen appropriately, the method is highly accurate.

According to an example, the energy being stored in the electric storage device is allocated to the segments starting with the segments having low power demand. To this end, the segments may be sorted by the respective power demand. Then the energy being available in the electric storage device is allocated to the segments starting with the one having the lowest power demand. The allocation of energy is stopped if the remaining energy level is zero or falls below a predefined threshold. Consequently, the energy being available in the electric storage device is used to a high degree. At the same time the method of attributing the energy to the segments is simple. Of course, this kind of energy allocation is only necessary if the total energy demand of the segments exceeds the energy amount being available in the electric storage device. Otherwise, the vehicle could travel along the route using the electric traction machine only.

The energy being stored in the electric storage device may be allocated to the segments such that the available energy in the electric storage device is substantially completely used when reaching an end of the route and a corresponding first reference trajectory is derived. It is noted that the term "first" is used for the simplicity of explanation only and does not imply a number of trajectories. Such a first reference trajectory may be designated a depletion trajectory since the objective is to use substantially the entire energy being available in the electric storage device. In this context, using the available energy completely or entirely means that the electric storage device is emptied. Technically speaking this means that the electric storage device is depleted until a lower state-of-energy threshold is reached. In such a scenario the combustion engine is used as little as possible. Consequently, the hybrid electric vehicle is operated at high efficiency. The first reference trajectory may especially be used for plug-in-hybrid vehicles having a fully or partially charged electric storage device at the start of the drive cycle.

It is noted that, of course, also the transfer of energy into the electric storage device while travelling along the route, is considered by the method. Energy may be transferred to the electric storage device if the electric traction machine operates as an electric generator. In this case, the electric traction machine may be powered by the inertial motion of the vehicle or by the electric combustion engine. Alternatively, in the case of a PHEV, the electric storage device may receive additional energy from a grid. Since charging of any kind alters the current state-of-energy of the electric storage device, this at least has an influence on the slope calculated as a step of the method according to the present disclosure.

The energy being stored in the electric storage device or the energy planned to be stored in the electric storage device may be allocated to the segments such that at the end of the route a predefined energy level remains in the electric storage device and a corresponding second reference trajectory is derived. As before, the term "second" is used for the simplicity of explanation only and does not imply a number of trajectories. The predefined energy level may correspond to a fully charged state of the electric storage device or to a predefined partially charged state. The second reference trajectory may be designated a charge sustain trajectory. The second reference trajectory may be especially useful for a non-plug-in hybrid electric vehicle since it leads to a situation in which at least a certain amount of energy is available from the electric storage device for a potentially upcoming low speed segment or a potentially upcoming low power driving segment. Moreover, the second reference trajectory may be applied if at a start of the drive cycle the electric storage device is empty or the state-of-energy is below a predefined threshold. Also the calculation of the second reference trajectory is computationally efficient. As has already been explained, a transfer of energy into the electric storage device during travelling is of course taken into account when calculating the second reference trajectory.

The second reference trajectory may be used for controlling the hybrid electric vehicle if the current state-of-energy is below a sustain threshold. In simplified words, this means that the current state-of-energy is below a specific, predefined state-of-energy. Since the second reference trajectory leads to a desired state-of-charge at the end of a drive cycle, i.e. at the end of the route, this is a simple and reliable way of operating the electric vehicle efficiently.

The second reference trajectory may for example be calculated in that segments with a power demand below a specific and relatively low level are designated depletion segments, i.e. energy being stored in the electric storage device is allocated to these segments. The second trajectory can then be constructed by summing up all the energy in the depletion segments, starting from the end of the route, i.e. at the desired final energy level of the electric storage device and going backward to the first segment.

According to an example, control points on different reference trajectories are used for controlling the hybrid electric vehicle. This means that depending on the situation while travelling along the route, the method is able to switch between the reference trajectories used for controlling the operation of the hybrid electric vehicle. Thus, the method is able to be situationally adapted while travelling. This renders the operation of the hybrid electric vehicle efficient and reliable at the same time.

The method may be performed periodically, considering the remaining segments of the route. In other words, the method is performed with a receding horizon. This leads to the fact that at the end of the route the desired state-of-energy of the electric storage device is reached with high reliability. At the same time, the hybrid electric vehicle is operated efficiently.

An on/off-threshold for the engine may be increased if the slope is positive. A positive slope means that the state-of-energy at the upcoming control point is lower than the current state-of-charge. Consequently, discharge of the electric storage device needs to be encouraged. This is done in that the on/off-threshold for the engine, e.g. in terms of power demand, is increased. In a simplified manner, this means that during travelling the engine is switched on later and turned off earlier, such that the portion of travelling without using the combustion engine is increased.

An on/off-threshold for the engine may be decreased if the slope is negative or zero. A negative slope means that the current state-of-energy is lower than the state-of-energy at the upcoming control point. If the slope is zero, the current state-of-energy substantially equals the state-of-energy at the upcoming control point. In both cases charging of the electric storage device is to be encouraged, i.e. the use of the combustion engine is to be encouraged. To this end, the corresponding on/off-threshold, e.g. in terms of power demand, is lowered. In simplified words, this means that during travelling the engine is switched on earlier and turned off later, such that the portion of the route is increased during which the combustion engine is used.

In another example, a charging threshold for the slope is defined and the combustion engine is used for charging the electric storage device if the slope falls below the charging threshold. The charging threshold has a negative value. In doing so, a desired state-of-energy of the electric storage device may be achieved with high reliability.

Additionally, the on/off-threshold for the engine may also be set as a function of vehicle speed.

The hybrid electric vehicle may be driven by the electric traction machine only if the requested travel speed is below a low-speed threshold. If a hybrid electric vehicle travels at low speed the noise, vibration and harshness (NVH) produced by a combustion engine is rather prominent as compared to the wheel noise and wind noise. The noise produced by the electric traction machine is substantially lower as compared to the combustion engine. Consequently, the acoustic comfort of the passengers is enhanced. The same is true for persons being present in the surroundings of the hybrid electric vehicle.

The hybrid electric vehicle may be driven by the electric traction machine only, if the current state-of-energy is sufficient for reaching an end of the route. Since the electric traction machine offers a higher operational efficiency than the combustion engine, this enhances the overall efficiency of the hybrid electric vehicle.

The method according to the disclosure may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

According to a second aspect, there is provided a data processing device comprising means for carrying out the method according to the disclosure. Such a data processing device allows to operate a hybrid electric vehicle in a highly efficient manner. Furthermore, it is computationally efficient.

It should be noted that the above examples may be combined with each other irrespective of the aspect involved. Accordingly, the method may be combined with features of the data processing device and, likewise, the data processing device may be combined with features described above with regard to the method.

These and other aspects of the present disclosure will become apparent from and elucidated with reference to the examples described hereinafter.

Examples of the disclosure will be described in the following with reference to the following drawings.

The figures are merely schematic representations and serve only to illustrate examples of the disclosure. Identical or equivalent elements are in principle provided with the same reference signs.

Figure 1:
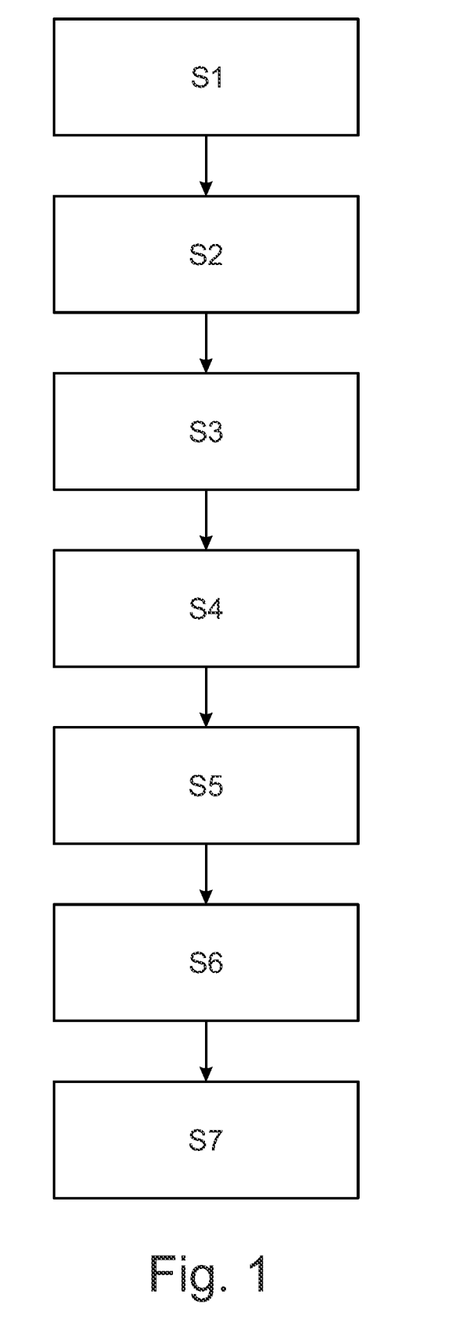
FIG. 1 shows a method according to the present disclosure.

FIG. 1 shows a method for operating a hybrid electric vehicle having an electric traction machine being electrically coupled to an electric storage device, and an internal combustion engine.

In a first step S1, the method receives a route information in the form of a plurality of N parameter sets, each parameter set relating to a segment of a route.

The N parameter sets may be provided by a navigation unit.

In the present example, each parameter set comprises a parameter describing an average speed and a parameter describing an average road slope over the corresponding segment. The average speed may be derived from a speed limit being stored as a part of the map data of the navigation unit.

Of course, each segment is indexed on the route such that the position of each segment along the route is known.

In a second step S2, the number N of parameter sets is reduced. In the present example, the number N is reduced by 50% in that pairs of parameter sets describing adjacent route segments are combined into a respective aggregated parameter set. This means that for each pair, an aggregated average speed is calculated using the respective average speed of the parameter sets forming the pair and an aggregated average road slope is calculated using the respective average road slope of the parameter sets forming the pair. The calculation of the aggregated parameter set may be weighed by the distance covered by the respective segment. Of course, if the segments cover the same distance, the parameter sets to be aggregated are equally weighed. The resulting number of parameter sets is thus N/2 in the present example.

Subsequently, in a third step S3, a power demand for each segment is estimated. In this context, the power demand may have a positive sign if the hybrid electric vehicle at least theoretically needs to apply power to the road. The power demand may have a negative sign if the hybrid electric vehicle receives power, e.g. because it is supposed to travel down a very steep route segment.

In order to estimate the power demand, a vehicle model is used which will be explained in detail later.

Thereafter, in a fourth step S4, a portion of an amount of energy being stored in the electric storage device is allocated to a selection of the segments. At the same time, if applicable, an amount of energy to be transferred into the electric storage device is allocated to the segments, in which the electric storage device is to be charged.

To this end, the segments are sorted with respect to their power demand and the energy being stored in the electric storage device is allocated to the segments starting with the segments having the lowest power demand until substantially all of the energy stored in the electric storage device is used. In detail, this means that the energy stored in the electric storage device is used until the state-of-energy reaches a predefined threshold.

Figure 2:
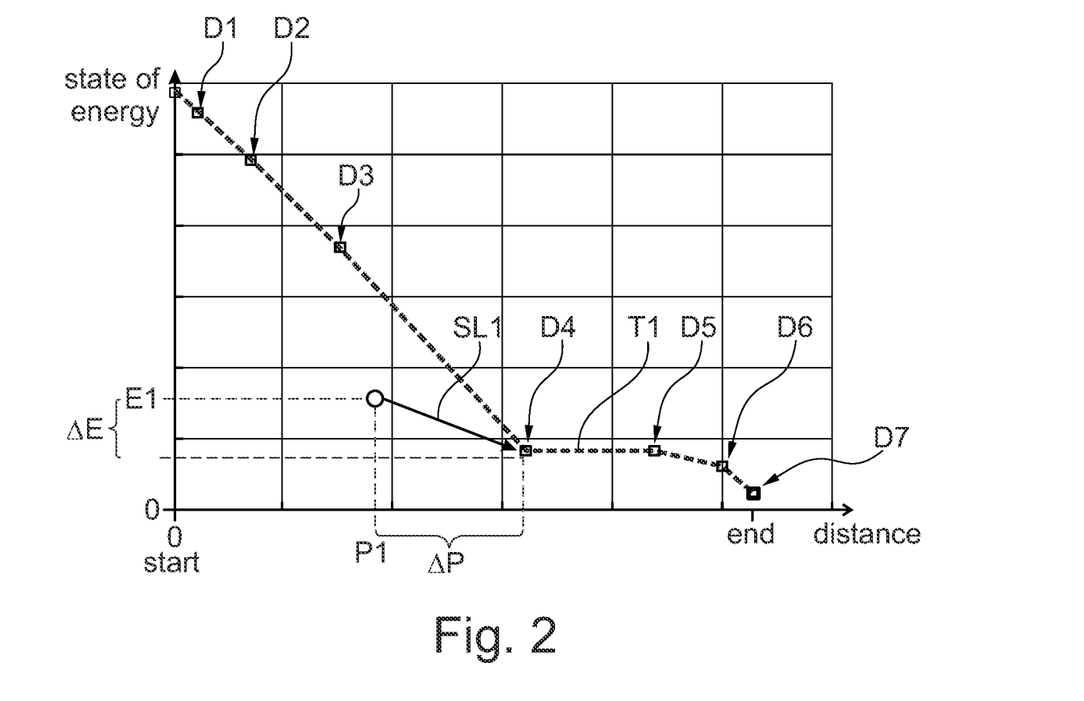
FIG. 2 shows an exemplary first reference trajectory being calculated by the method of FIG. 1.

Then, in a fifth step S5, a first reference trajectory T1 describing the state-of-energy of the electric storage device over the route is derived from this energy allocation. An example thereof is represented in FIG. 2. This first reference trajectory T1 is a so-called depletion trajectory since substantially all the energy being available in the electric storage device is used when the end of the route is reached.

In order to be able to efficiently control the operation of the hybrid electric vehicle, a plurality of control points is defined on the first reference trajectory (sixth step S6).

In the example of FIG. 2, seven control points D1 to D7 are defined, wherein the control point D7 represents the state-of-energy at the end of the route.

In the present example, in the fourth step S4, the energy being stored in the electric storage device may also be allocated to the route segments in another manner.

Now, the energy being stored in the electric storage device or the energy planned to be stored in the electric storage device is allocated to the segments such that at the end of the route a predefined energy level remains in the electric storage device.

Figure 3:
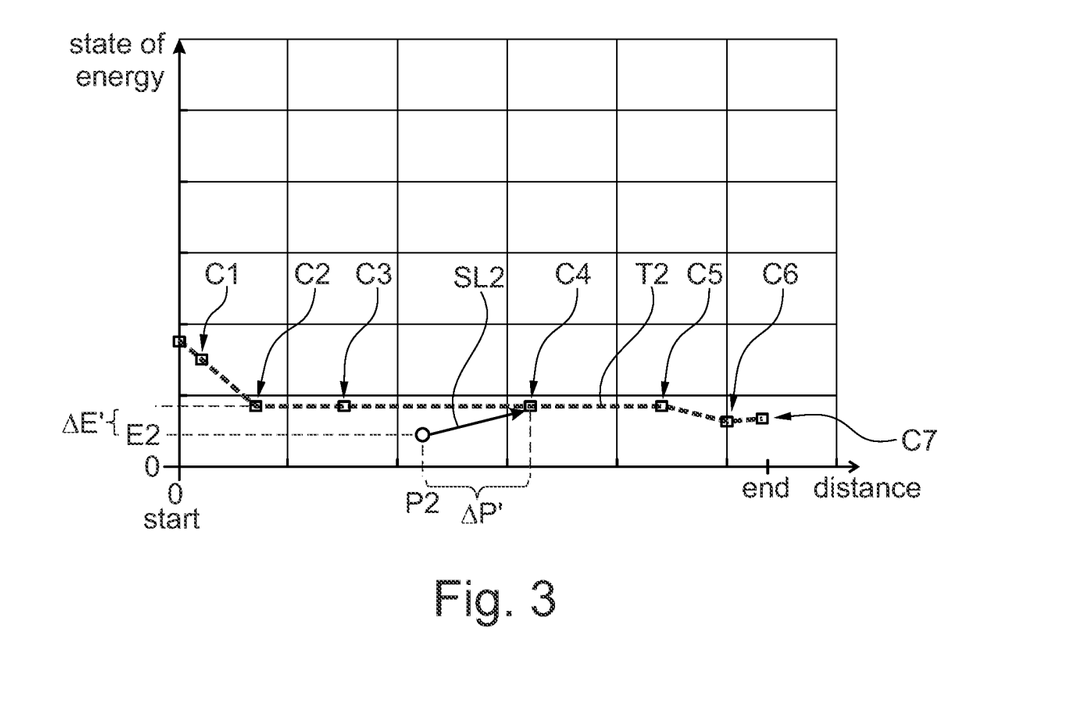
FIG. 3 shows an exemplary second reference trajectory being calculated by the method of FIG. 1.

Then, in the fifth step S5, a corresponding second reference T2 trajectory is derived describing the reference state-of-energy of the electric storage device over the route. The second reference trajectory T2 is represented in FIG. 3. This second reference trajectory is a so-called sustain trajectory.

Again, seven control points C1 to C7 are defined, wherein the control point C7 represents the state-of-energy at the end of the route.

In this context, the first reference trajectory T1 is calculated starting from a state-of-energy of the electric storage device at the start of the drive cycle. Then, the available energy is assigned to the segments starting with the segment demanding the lowest power in such a way that the energy stored in the electric storage device is substantially fully used at the end of the drive cycle. In technical terms this means that a low energy level is reached at the end of the drive cycle.

The second reference trajectory T2 is calculated independent from the state-of-energy of the electric storage device at the beginning of the drive cycle. The calculation starts from the end of route and the desired state-of-energy at this point. The second reference trajectory T2 is then calculated recursively backwards from the end of the route to the start of the route. The assigned changes of the state-of-energy for each segment are defined based on the segment power demand.

Subsequently, in a seventh step S7, the operation of the hybrid electric vehicle is controlled in a closed loop as a function of a slope between a current state-of-energy and the state-of-energy at an upcoming control point on the first reference trajectory T1 or the second reference trajectory T2.

In FIG. 2, an exemplary current state-of-energy E1 occurring at an exemplary position P1 within the route is illustrated. The slope SL1 between the current state-of-energy and the state-of-energy at the upcoming control point D4 is also illustrated. It is calculated by dividing the difference ΔE between the current state-of-energy E1 and the state-of-energy at the control point D4, divided by the route distance ΔP between the current position P1 and the position of the control point D4 along the route.

Also in FIG. 3, an exemplary current state-of-energy E2 occurring at an exemplary position P2 within the route is illustrated. The slope SL2 between the current state-of-energy and the state-of-energy at the upcoming control point C4 is also illustrated. It is calculated by dividing the difference ΔE' between the current state-of-energy E2 and the state-of-energy at the control point C4, divided by the route distance ΔP' between the current position P2 and the position of the control point C4 along the route.

While travelling along the route, both reference trajectories T1, T2 may be used as will be explained in the following.

In the present example, the second trajectory T2 (cf. FIG. 3) is used for controlling the hybrid electric vehicle if the current state-of-energy is below a predefined sustain threshold. In simplified words, this means that the second reference trajectory T2 is used if the state-of-energy falls below a minimum acceptable level. Otherwise, the first reference trajectory T1 is used. This means that if the state-of-energy is above the minimum acceptable level, it is intended to use the electric traction machine and thus the energy stored in the electric storage device as much as possible.

For both reference trajectories T1, T2, an on/off-threshold for the engine is increased if the slope is positive, i.e. if the current state-of-energy is above the state-of-energy at the upcoming control point. This means that the use of the electric traction machine is encouraged.

The on/off-threshold for the engine is decreased if the slope is negative or zero. This means that if the current state-of-energy is equal or lower than the state-of-energy at the upcoming control point, the use of the combustion engine is encouraged.

In both cases the on/off-threshold may be a power demand level. The on/off-threshold is further set as a function of vehicle speed.

If, during the performance of the method the current state-of-energy is discovered to be sufficient for reaching an end of the route, the hybrid electric vehicle is driven by the electric traction machine only, i.e. the combustion engine is switched off and the electric traction machine is operated as an electric motor or an electric generator depending on the situation.

Beyond that, the hybrid electric vehicle may be driven by the electric traction machine only, if the requested travel speed is below a low-speed threshold.

The method as described above is performed periodically, always considering the remaining segments of the route. Thus, the reference trajectories T1, T2 and the control points C1-C7, D1-D7 are re-calculated periodically in order to reach the desired state-of-energy at the end of the route with high reliability.

Figure 4:
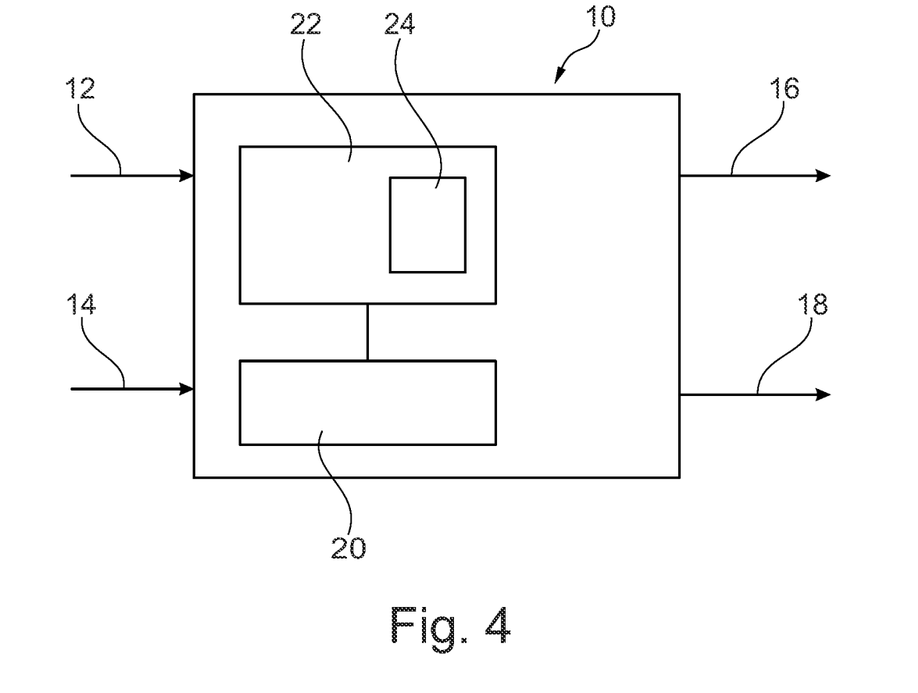
FIG. 4 shows a data processing device according to the present disclosure comprising means for carrying out the method of FIG. 1.

FIG. 4 shows a data processing device 10 comprising means for carrying out the method as described above.

In more detail, the data processing device 10 has a first input interface 12 for receiving route information in the form of a plurality of parameter sets as described in step S1. To this end, the first input interface 12 is configured for being connected to a navigation unit.

A second input interface 14 is configured for receiving a state-of-energy of the electric storage device. The second input interface 14 is configured to be connected to a controller of the electric storage device.

Moreover, a first output interface 16 is configured for sending an operational request to a controller of the electric traction machine, e.g. an on/off request or an on/off-threshold. It is also possible to send a charge request to the electric traction machine indicting a desired charging power for the electric storage device. In this case, the electric traction machine needs to operate as a generator. The request will be zero if no charging is requested.

A second output interface 18 is configured for sending an on/off-threshold to a controller of the combustion engine.

Furthermore, the data processing device 10 comprises a processor 20 and a memory 22 which are configured for performing a method as described above.

To this end, also a vehicle model 24 is provided on the memory 22. The vehicle model 24 comprises a value characterizing a vehicle mass and a look-up table comprising parameters defining road load in function of a road slope, an average speed and a corresponding distance. Alternatively, these parameters can be estimated using other data processing devices of the vehicle.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other

LIST OF REFERENCE SIGNS 10 data processing device
12 first input interface
14 second input interface
16 first output interface
18 second output interface
20 processor
22 memory
24 vehicle model
C1-C7 control point
D1-D7 control point
E1 current state-of-energy
E2 current state-of-energy
ΔE difference between current state-of-energy and state-of-energy at upcoming control point
ΔE' difference between current state-of-energy and state-of-energy at upcoming control point
P1 current position
P2 current position
ΔP route distance
ΔP' route distance
S1 first step
S2 second step
S3 third step
S4 fourth step
S5 fifth step
S6 sixth step
S7 seventh step
SL1 slope
SL2 slope
T1 first reference trajectory
T2 second reference trajectory

The invention claimed is:

1. A method for operating a hybrid electric vehicle having an electric traction machine being electrically coupled to an electric storage device, and an internal combustion engine, the method comprising:
   receiving, by a system comprising a processor, a route information in the form of a plurality of parameter sets, each parameter set relating to a corresponding segment of segments of a route and comprising a parameter describing an average speed, and at least one additional parameter describing at least one of an average road slope or an altitude difference over the segment;
   estimating, by the system, a power demand for each segment based on the route information;
   allocating, by the system, at least one of a portion of an amount of energy being stored in the electric storage device to at least one of the segments or an amount of energy to be transferred into the electric storage device to at least one of the segments;
   deriving, by the system, at least one reference energy level trajectory describing respective states-of-energy of the electric storage device over the route resulting from the allocating;
   defining, by the system, a plurality of control points of the route on the at least one reference energy level trajectory; and
   controlling, by the system, operation of the hybrid electric vehicle as a function of a slope of a line determined based on a difference between a current state-of-energy of the electric storage device and a reference state-of-energy at an upcoming control point of the plurality of control points of the route on the at least one reference energy level trajectory divided by a route distance between a current position of the hybrid electric vehicle on the route and the upcoming control point.

2. The method of claim 1, further comprising combining, by the system, at least some parameter sets of the plurality of parameter sets into one or more respective aggregated parameter sets.

3. The method of claim 1, wherein the power demand is estimated based on a vehicle model of the hybrid electric vehicle.

4. The method of claim 1, wherein the energy being stored in the electric storage device is allocated to the at least one of the segments starting with respective segments having lowest power demand.

5. The method of claim 1, wherein the amount of energy being stored in the electric storage device is allocated to the at least one of the segments such that the amount of energy in the electric storage device is substantially completely used when reaching an end of the route and a corresponding first reference energy level trajectory of the at least one reference energy level trajectory is derived.

6. The method of claim 1, wherein the amount of energy being stored in the electric storage device is allocated to the at least one of the segments such that at the end of the route a predefined energy level remains in the electric storage device and a corresponding second reference energy level trajectory of the at least one reference energy level trajectory is derived.

7. The method of claim 6, wherein the second trajectory is used for controlling the hybrid electric vehicle in response to the current state-of-energy being below a sustain threshold.

8. The method of claim 1, wherein respective control points of the route on the at least one reference energy level trajectory are used for controlling the hybrid electric vehicle.

9. The method of claim 1, wherein the method is performed periodically, considering remaining segments of the route.

10. The method of claim 1, wherein an on/off-threshold for the internal combustion engine is increased in response to the slope being positive, wherein the slope being positive indicates that the reference state-of-energy at the upcoming control point is lower than the current state-of-energy.

11. The method of claim 1, wherein an on/off-threshold for the internal combustion engine is decreased in response to the slope being negative or zero, wherein the slope being negative indicates that the reference state-of-energy at the upcoming control point is higher than the current state-of-energy, and wherein the slope being zero indicates that the reference state-of-energy at the upcoming control point is substantially equal to the current state-of-energy.

12. The method of claim 1, wherein an on/off-threshold for the internal combustion engine is set as a function of vehicle speed.

13. The method of claim 1, wherein the hybrid electric vehicle is driven only by the electric traction machine, in response to the requested travel speed being below a low-speed threshold.

14. The method of claim 1, wherein the hybrid electric vehicle is driven only by the electric traction machine, in response to the current state-of-energy being sufficient for reaching an end of the route.

15. A hybrid electric vehicle, comprising:
   an electric traction machine being electrically coupled to an electric storage device;

an internal combustion engine
a memory that stores computer executable instructions; and
a processor that executes at least one of the computer executable instructions that:
  receives a route information in the form of a plurality of parameter sets, each parameter set relating to a corresponding segment of segments of a route and comprising a parameter describing an average speed, and at least one additional parameter describing at least one of an average road slope or an altitude difference over the segment;
  estimates a power demand for each segment based on the route information;
  allocates at least one of a portion of an amount of energy being stored in the electric storage device to at least one of the segments or an amount of energy to be transferred into the electric storage device to at least one of the segments;
  derives at least one reference energy level trajectory describing respective states-of-energy of the electric storage device over the route resulting from the allocating;
  defines a plurality of control points of the route on the at least one reference energy level trajectory; and
  controls operation of the hybrid electric vehicle as a function of a slope of a line determined based on a difference between a current state-of-energy of the electric storage device and a reference state-of-energy at an upcoming control point of the plurality of control points of the route on the at least one reference energy level trajectory divided by a route distance between a current position of the hybrid electric vehicle on the route and the upcoming control point.

16. The hybrid electric vehicle—of claim 15, wherein an on/off-threshold for the internal combustion engine is increased in response to the slope being positive, wherein the slope being positive indicates that the reference state-of-energy at the upcoming control point is lower than the current state-of-energy.

17. The hybrid electric vehicle—of claim 15, wherein an on/off-threshold for the internal combustion engine is decreased in response to the slope being negative or zero, wherein the slope being negative indicates that the reference state-of-energy at the upcoming control point is higher than the current state-of-energy, and wherein the slope being zero indicates that the reference state-of-energy at the upcoming control point is substantially equal to the current state-of-energy.

18. A non-transitory computer-readable medium having instructions stored thereon that, in response to execution, cause a system comprising a processor to perform operations comprising:
  receiving a route information in the form of a plurality of parameter sets, each parameter set relating to a corresponding segment of segments of a route of a hybrid electric vehicle and comprising a parameter describing an average speed, and at least one additional parameter describing at least one of an average road slope or an altitude difference over the segment;
  estimating a power demand for each segment based on the route information;
  allocating at least one of a portion of an amount of energy being stored in the electric storage device to at least one of the segments or an amount of energy to be transferred into the electric storage device to at least one of the segments;
  deriving at least one reference energy level trajectory describing respective states-of-energy of the electric storage device over the route resulting from the allocating;
  defining a plurality of control points of the route on the at least one reference energy level trajectory; and
  controlling operation of the hybrid electric vehicle as a function of a slope of a line determined based on a difference between a current state-of-energy of the electric storage device and a reference state-of-energy at an upcoming control point of the plurality of control points of the route on the at least one reference energy level trajectory divided by a route distance between a current position of the hybrid electric vehicle on the route and the upcoming control point.

19. The non-transitory computer-readable medium of claim 18, wherein an on/off-threshold for the internal combustion engine is increased in response to the slope being positive, wherein the slope being positive indicates that the reference state-of-energy at the upcoming control point is lower than the current state-of-energy.

20. The non-transitory computer-readable medium of claim 18, wherein an on/off-threshold for the internal combustion engine is decreased in response to the slope being negative or zero, wherein the slope being negative indicates that the reference state-of-energy at the upcoming control point is higher than the current state-of-energy, and wherein the slope being zero indicates that the reference state-of-energy at the upcoming control point is substantially equal to the current state-of-energy.

* * * * *